United States Patent [19]
Nishiuchi et al.

[11] Patent Number: 5,097,464
[45] Date of Patent: Mar. 17, 1992

[54] OPTICAL RECORDING MEDIUM AND OPTICAL RECORDING/REPRODUCING APPARATUS

[75] Inventors: Kenichi Nishiuchi, Moriguchi; Nobuo Akahira, Yawata, both of Japan

[73] Assignee: Matsushita Electric Industrial Co., Ltd., Osaka, Japan

[21] Appl. No.: 556,975

[22] Filed: Jul. 24, 1990

[30] Foreign Application Priority Data

Jul. 24, 1989 [JP] Japan .................................. 1-191003

[51] Int. Cl.$^5$ .............................................. G11B 7/00
[52] U.S. Cl. .................................. 369/112; 369/44.24; 369/118
[58] Field of Search ................... 369/112, 118, 103, 94, 369/95, 44.21–44.25, 44.27, 44.11, 44.14

[56] References Cited

U.S. PATENT DOCUMENTS 3,999,009 12/1976 Bouwhuis .
4,725,721 2/1988 Nakamura et al. .................. 369/112

FOREIGN PATENT DOCUMENTS

63096745 4/1988 Japan. .
62-52775 3/1987 Japan. .
63-222331 9/1988 Japan. .
59-8147 1/1984 Japan. .

*Primary Examiner*—Roy N. Envall, Jr.
*Assistant Examiner*—Nabil Hindi
*Attorney, Agent, or Firm*—Wenderoth, Lind & Ponack

[57] ABSTRACT

A data playback apparatus for reproduction of data from an optical recording medium which has a data layer disposed on a substrate thereof having a specific thickness is provided with an optical length corrector interposed between the recording medium and an objective lens for converging a light beam. The optical length corrector is selected so that the sum of the optical length of the substrate of the recording medium and the optical length of the optical length corrector equals a predetermined length for the objective lens. Accordingly, the light passing the objective lens can converge on the data layer developing a light spot close to the limit of refraction, regardless of the thickness of the substrate of the recording medium.

17 Claims, 5 Drawing Sheets

FOCUS ERROR SIGNAL

FIG. 7(b)

REPRODUCED SIGNAL AMPLITUDE

→ DISPLACEMENT OF OBJECTIVE LENS

OPTICAL RECORDING MEDIUM AND OPTICAL RECORDING/REPRODUCING APPARATUS

BACKGROUND OF THE INVENTION

1) Field of the Invention

The present invention relates to an optical recording medium having a data layer provided on a substrate of an arbitrary thickness and an optical recording/reproducing apparatus therefor, and further relates to an optical recording/reproducing apparatus for a recoding medium having a plurality of data layers.

2) Description of the Prior Art

The techniques of recording and reproducing data with using laser light have been realized in the form of optical disk apparatuses. There are three different operational types of disk apparatuses: a read-only type apparatus, e.g. a popular compact disk player or a laser disk player; a write-once-read-many type apparatus for handling e.g. document files or data files; and a rewritable optical disk apparatus.

The common technique among the apparatuses lies in applying light onto the substrate of an optical disk and detecting the light reflected therefrom for reproduction of signals. Regardless of the diameter of the optical disk or the recording signals to be used in a disk apparatus, each disk substrate is commonly about 1.2 mm in thickness. In the optical system of each optical disk playback device, an objective lens is employed which has a large numerical aperture for convergence of light close to the limit of wavelength diffraction and can focus behind the disk substrate without aberration. Hence, for convergence of light close to the limit of optical diffraction, the substrate preferably has a specific thickness.

A known optical disk is at least 3.5 inches in diameter. However, it is much desired to reduce not only the diameter of the substrate but also the thickness for the purpose of improving the portability and minimizing the installation area of an optical disk recording/reproducing apparatus. To play back a disk having such a thinner substrate, the playback device needs to have a specified objective lens corresponding to the thickness of the substrate from the reason described previously. Then, the problem arises that a conventional optical disk cannot be played back with the arrangement of such a modified optical system.

Figure 8A:
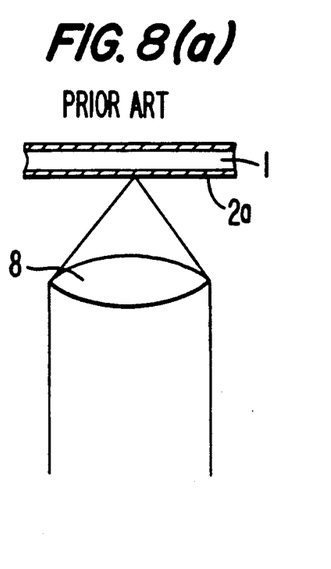
FIGS. 8(a)-8(b) are schematic views showing a prior art arrangement.
Figure 8B:
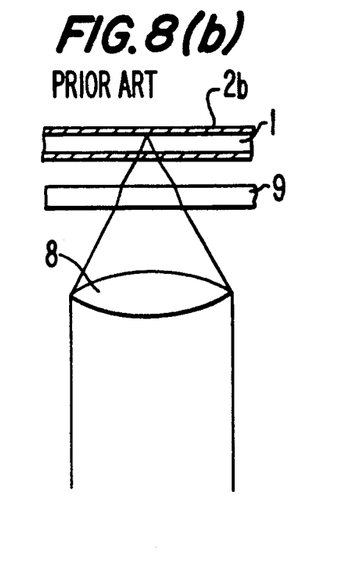

Also, for the purpose of increasing the memory capacity, multi-layer optical disks have been proposed having a plurality of data layers. One of such multilayer optical disks disclosed in U.S. Pat. No. 3,999,009 is shown in FIGS. 8(a)-8(b) in which a detachable transparent plate 9 is provided between a recording medium and an objective lens 8 for displacing the focal point of the objective lens for reproduction of data from an arbitrary data layer. More particularly, the focusing is made on an objective lens side one 2a of the two data layers 2a and 2b provided on both sides of a substrate 1 with the absence of the transparent plate 9 as shown in FIG. 8(a) and on the other data layer 2b when the transparent plate 9 is mounted in place as shown in FIG. 8(b). However, the transparent plate 9 is employed only for increasing the focal length of the objective lens 8 and no aberration of the lens 8 is regarded. In fact, even if the convergence of light is established close to the limit of diffraction as shown in FIG. 8(a), the use of the transparent plate 9 causes aberrations due to a difference in the light path distance across the objective lens 8 and the substrate 1, thus increasing the size of the light spot. Because the light spots on the data layers are different in aberration, the recording of data onto the data layers of the optical disk should be carried out by changing the recording density of data in response to the size of each light spot on the corresponding data layer. The disadvantage is that when the number of data layers is increased, the recording density becomes decreased.

SUMMARY OF THE INVENTION

A first object of the present invention to provide an apparatus capable of reproducing data from different optical data recording mediums whose substrates are different in thickness from each other.

The present invention is thus directed towards an optical data recording/reproducing apparatus, in which the recording and reproduction of data is carried out by directing a light beam onto an optical data recording medium and detecting a reflected or transmitted light, comprising a light source, an objective lens for converging a light beam from the light source through a planer plate having a predetermined optical length, and a means provided between the objective lens and the optical data recording medium for correcting the optical length. According to this arrangement, an optical distance between the objective lens and the recording surface of the data recording layer medium remains constant allowing a light spot to be established with less aberration on a data recording layer of the optical recording medium. As the result, the reproduction of data is possible from various optical disks whose substrates are different in thickness from each other.

It is a second object of the present invention to provide a recording/reproducing apparatus which can record data signals on and reproduce data signals from a recording medium having at least two data recording layers with less optical aberration.

According to the present invention, such an arrangement is provided that comprises a light source, an objective lens capable of focusing behind a planer plate having a specific optical length and converging a light beam from the light source on any data recording layer of an optical recording medium, an optical length correcting means provided between the objective lens and the optical recording medium and having at least two different optical lengths, and a photodetector for detecting a reflected or transmitted light from the recording medium, so that a desired optical length of the optical length correcting means can be determined corresponding to the location of the data layer. As the result, a light spot with less aberration will be established on an arbitrary data layer of the optical recording medium.

DESCRIPTION OF THE PREFERRED EMBODIMENTS

Embodiment 1

Figure 1:
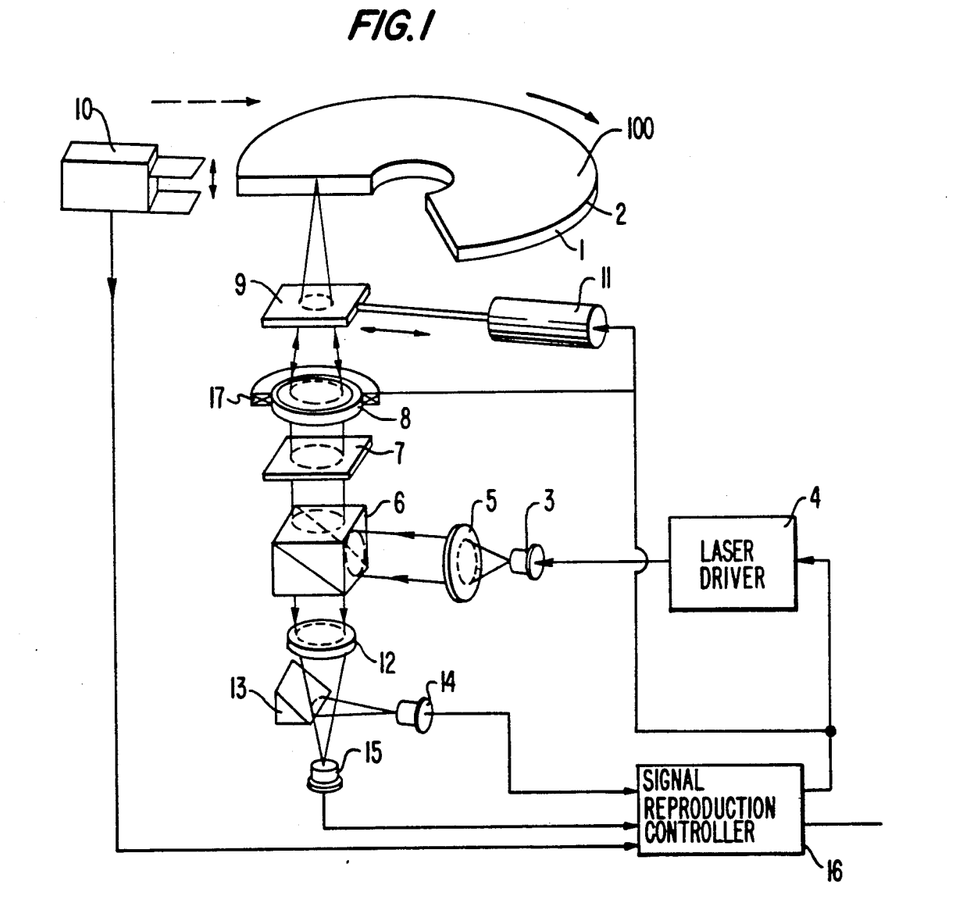
FIG. 1 is a schematic view showing the entire system of a recording/reproducing apparatus according to the present invention.

FIG. 1 illustrates an optical data recording/reproducing apparatus according to the present invention. There is provided, as the data recording medium, an optical disk 100 having a data layer 2 disposed on a transparent substrate 1. The data layer 2 incorporates pits arranged thereon corresponding to data signals or patterns of optical density variations or magnetization changes developed thereon.

For reproduction of data recorded on the optical disk, a light source, or laser diode, 3 which emits light of 830 nm wavelength is used. The light emitted from the laser diode 3 after modulation with a laser driver 4 is shifted by a collimator lens 5 to a parallel beam which is then reflected by a polarized beam splitter 6 and passes across a ¼ wave plate 7 to an objective lens 8 and an optical length correcting transparent plate 9 before converging on the data layer 2 of the optical disk. The objective lens 8 is arranged to focus the light beam on the data layer 2, without the transparent plate 9, when the optical length of the transparent substrate 1 of the optical disk 100 is equal to a predetermined optical length. If the optical length of the transparent substrate 1 is shorter than the predetermined optical length, the transparent plate 9 is placed across the light path between the objective lens 8 and the optical disk 100. The optical length of the transparent plate 9 is equal to a difference between the optical length of the transparent substrate 1 and the predetermined optical length. The transparent plate 9 is actuated by a plate actuator 11 for moving into and withdrawing from the light path according to information of the substrate thickness detected by a disk shape detector 10.

The light reflected on the data layer 2 then passes in sequence the transparent plate 9, the objective lens 8, the ¼ wave plate 7, the polarized beam splitter 6, and a lens 12 to a mirror 13. Then, a portion of the light reflected from the mirror 13 enters a focus control photodetector 14 having two separate sensor areas for focus control, while the remaining light goes straight to a two-sensor photodetector 15 for tracking control and data reproduction. The corresponding signals from the two photodetectors 14 and 15 are transmitted to a signal reproduction controller 16 where they are turned to a reproduced data signal and a control signal: the latter actuates a voice coil 17 for focusing and tracking control so that the focal point of the objective lens 8 goes to a target data pattern on the data layer 2. The optical system may be modified for detection of variations in the magnetization by means of a magneto-optical effect, in which the polarized beam splitter 6 and mirror 13 are replaced with a half mirror and a large-size polarized beam splitter respectively.

The substrate of the optical disk may be made of a resin material, e.g. polycarbonate and polymethylmethacrylate (PMMA), or glass.

The transparent plate 9 is preferably such that both incident and emerging surfaces thereof are approximately parallel to each other, the transmittance is high at the wavelength of the incident light, and the refractive index at the wavelength of the incident light is equal to that of the substrate of the optical disk. Also, its material can be selected from glass and synthetic resin. A reflection prevention layer may additionally be provided on either or both the incident and emerging surfaces of the transparent plate for increasing the transmittance efficiency of the incident light, thus ensuring the efficient use of the output of the laser diode.

As described previously, the objective lens employed in the optical disk apparatus is designed for corresponding to the wavelength of the laser light used and allowing the light beam to focus through the substrate having a specific optical length, e.g. 1.2 mm (with less effects of various aberrations). It is also understood that a commonly available standard optical disk incorporates a transparent substrate having such a specific optical length. When the reproduction from an optical disk having a substrate of less than 1.2 mm in thickness is performed using the objective lens, a particular transparent plate is employed such that the total thickness of the substrate and the transparent plate becomes 1.2 mm. For example, if the thickness of the optical disk substrate 1 is 0.8 mm, the transparent plate 9 having a thickness of 0.4 mm may be used. Hence, the optical length from the objective lens 8 to the data layer 2 is recovered to equal to the original length with the standard optical disk, ensuring the convergence of light with less optical error such as spherical aberration. The optical length is expressed by an expression, $n \times d$ where n is the refractive index of a medium through which light transmits and d is the thickness of the medium, or the length of the light path in the medium. For example, if the substrate is 1.2 mm-thick polymethyl-methacrylate plate 9 having $n = 1.4$, the optical length is 1.79 mm ($1.49 \times 1.2$).

The transparent plate can be installed upon detecting, with the disk shape detector 10, the thickness of an optical disk inserted into the optical disk recording/reproducing apparatus. The thickness of an optical disk may also be identified by reading a marking of thickness which has been formed on the disk or a cartridge of the disk. According to the information given by calculating the difference between the thickness of the optical disk and a thickness of a reference substrate which has been predetermined according to the design conditions of the objective lens, the controller 16 actuates the plate actuator 11 to set the transparent plate 9 of a desired thickness across the light path.

Figure 2A:
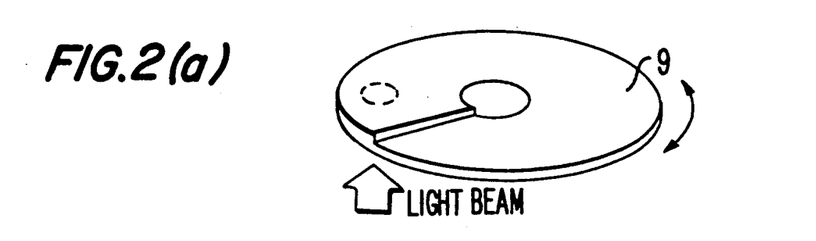
FIGS. 2(a)-2(d) are external views of a transparent plate explaining a first embodiment of the present invention.
Figure 2B:
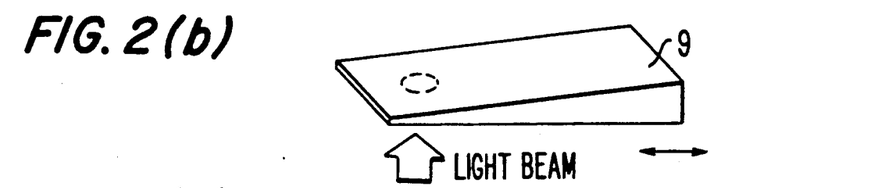
Figure 2C:
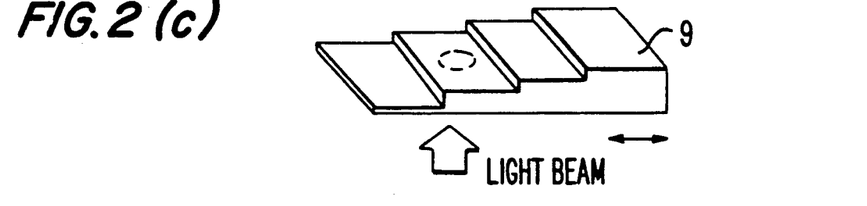
Figure 2D:
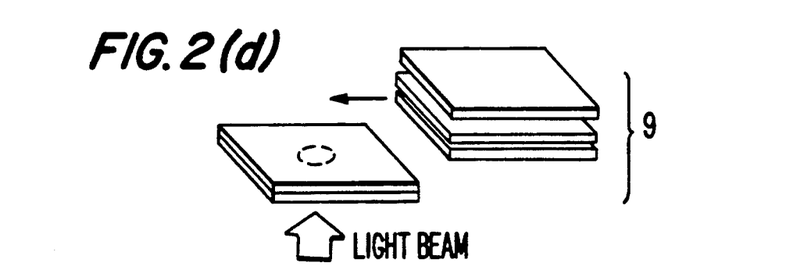

When the substrates of the optical disks to be loaded are different in thickness from each other, a particular shape of the transparent plate 9 can be provided as shown in FIGS. 2(a)-2(d). The plates are shaped so that the optical length thereof can be varied with or without steps: the optical length may vary continuously as shown in FIGS. 2(a) and 2(b) and in steps as shown in FIG. 2(c). The plates may be adapted for a rotating movement as shown in FIG. 2(a) or for a linear movement as shown in FIGS. 2(b) and 2(c). Also, a plurality of transparent plates may be provided for use in combination, as shown in FIG. 2(d). The arrow mark in FIG. 2 represent the direction of the movement of the transparent plate. For adjustment of the optical length using the transparent plate(s), the focus control is first made using the transparent plate situated at a proper location and a reproduced signal from the optical disk is detected. Then, while the transparent plate is rotated or linearly displaced, the amplitude of the signal is examined. When the signal amplitude reaches a maximum, the transparent plate is fixed at the position.

For constant positioning of the transparent plate, it is desired that the optical disk carries a signal recorded on a specified location thereof for control of the transparent plate thickness. In a common data format optical disk, the address or clock signal section for control of data signals, where a pattern of the control signal is duly identified, can be utilized for the purpose. In this manner, data signals on the optical disk will be read by the optimum focusing for reproduction.

This procedure is also applicable to an optical disk apparatus in which the thickness of each disk can be identified from its cartridge or the like and different type optical disks can be played back. For reproduction from a known standard optical disk, the transparent plate 9 is removed by the plate actuator 11 from the optical path between the disk and the objective lens 8. For reproduction from a thinner-substrate optical disk, the transparent plate 9 is inserted between the disk and the objective lens 8 by the plate actuator 11. The thickness of the transparent plate 9 should correspond to that of a different optical disk to be read.

The foregoing description is made with reference to a data layer carrying recorded data. If the data layer is capable of writing and reading, the recording of data is carried out by feeding data signals to be recorded from the outside and in response to the input signals, modulating the output of the laser diode with the laser driver circuit 4.

According to the aforementioned arrangement, the recording or reproduction from various optical disks which are different in thickness from each other can be executed and an apparatus for the recording and reproduction will be feasible.

Embodiment 2

Although the transparent plate is provided as a primary component in the optical playback system as described in Embodiment 1, the present invention resides in any medium which can complement the thickness of a substrate of an optical disk between the objective lens and the optical disk. The application of such a transparent plate to an optical disk in a prior art optical playback system will now be described referring to FIGS. 3, 4, and 5(a)-5(b).

Figure 3:
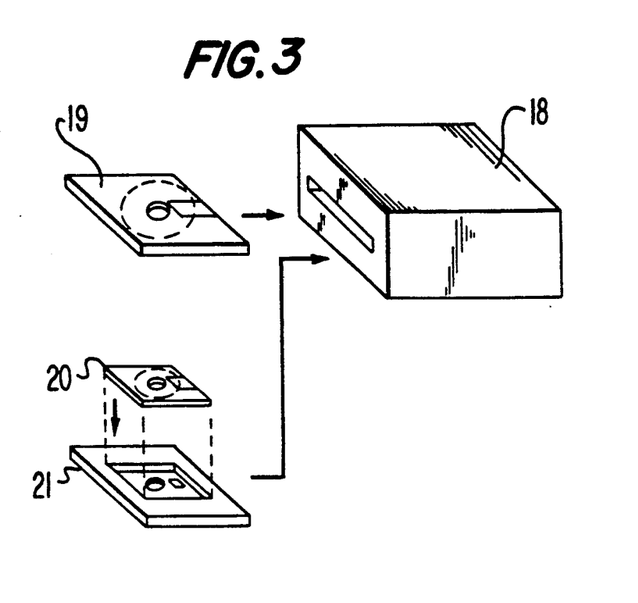
FIG. 3 is a schematic view showing an optical disk adapter according to a second embodiment of the present invention.

As shown in FIG.3, a known optical disk cartridge 19 carrying an optical disk therein is inserted into a conventional playback device 18 for setting to a disk motor, prior to reproduction of data from the optical disk. According to the present invention, a small-sized optical disk cartridge 20 incorporating a thinner substrate is accommodated in a conversion adapter 21 which has a size equal to the known optical disk cartridge 19 for reproduction with the conventional playback device 18.

Figure 4:
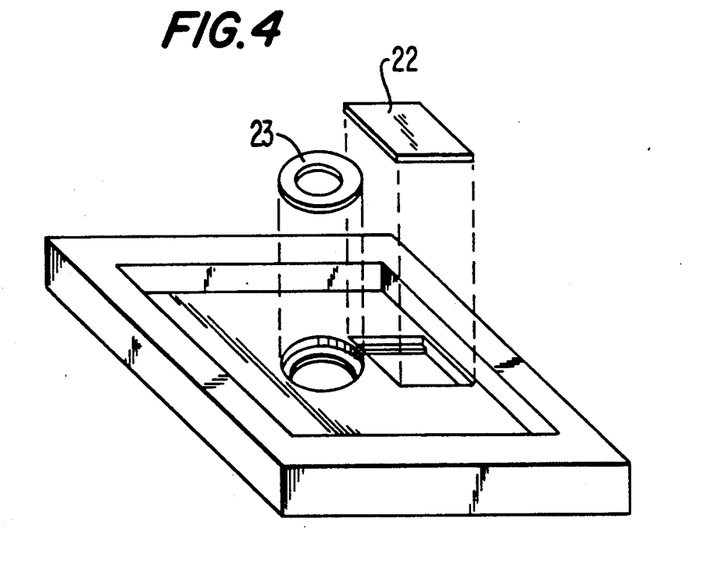
FIG. 4 is a schematic view of the conversion adapter of the second embodiment.
Figure 5A:
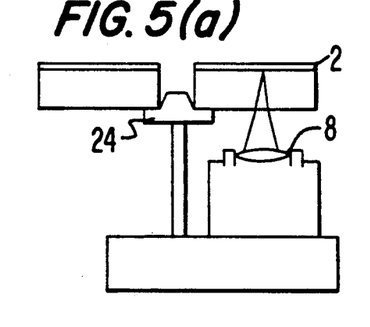
FIGS. 5(a)-5(b) are cross-sectional views showing the use of the conversion adapter of the second embodiment.
Figure 5B:
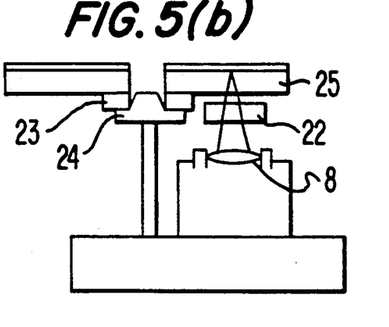

The conversion adapter 21 is shown in more detail in FIG.4. The conversion adapter 21 is provided with a transparent plate 22 for complement to the thickness of the optical disk and at the central region, a spacer ring 23 for complement to the thickness of the substrate of the optical disk. FIGS. 5(a) and 5(b) are cross-sectional views showing an optical disk of 1.2 mm thick loaded and a thinner disk loaded with the help of the spacer ring 23 in playback device respectively, in which other components including a casing of the cartridge are not shown. As shown, the spacer ring 23 mounted on a disk motor shaft 24 raises the thinner disk 25 allowing the distance between the data layer 2 and the objective lens 8 to be the same as with a conventional optical disk.

Accordingly, any thinner optical disk can be played back by a conventional playback device with the use of a conversion adapter.

Embodiment 3

Figure 6A:
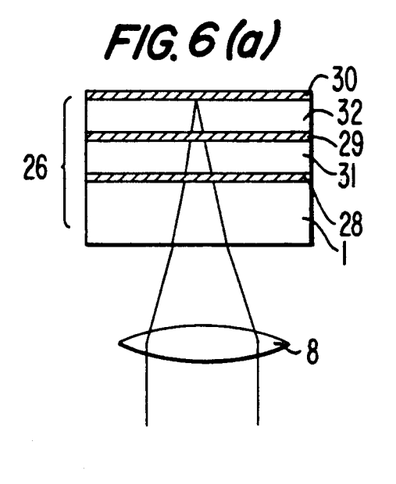
FIGS. 6(a)-6(c) are schematic views of the optical system with an optical disk showing a third embodiment of the present invention.
Figure 6B:
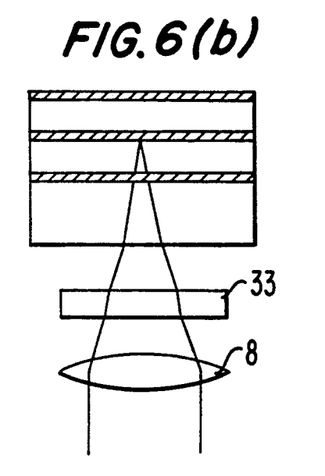
Figure 6C:
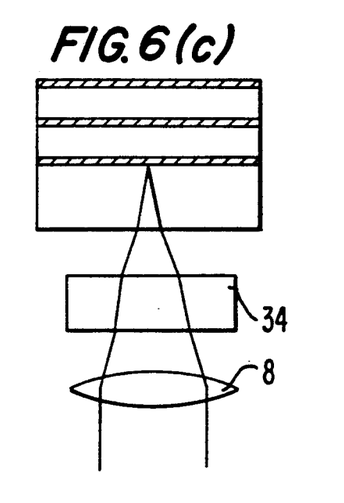

Referring to FIGS. 6(a)-6(c) a procedure will be described in which an optical disk having a plurality of data recording layers can be played back using a transparent plate interposed between the objective lens and the optical disk for shifting the focal position of a light spot. Such a multilayer optical disk 26 has three data layers 28, 29, and 30 disposed on a substrate 27 thereof and separated by transparent partition layers 31 and 32 respectively. The transparent partition layers 31 and 32 are each preferably made of a resin material, e.g. polycarbonate or polymethylmethacrylate (PMMA), or glass, having a property of high transmission at the wavelength of light used.

Any data layer can be selected by setting a corresponding transparent plate between the objective lens and the optical disk: with no use of any transparent plate, data on the third data layer 30 is reproduced by focusing the objective lens as shown in FIG. 6(a) data on the second data layer 29 is reproduced with a transparent plate 33 interposed between the objective lens and the optical disk for deflecting light to focus on the data surface of the layer 29 as shown in FIG. 6(b); and data on the first layer 28 is reproduced using thicker transparent plate 34 allowing the focal point to be located near the surface of the substrate as shown in FIG. 6(c).

The relationship between the thickness of a data layer of the optical disk and the thickness of a transparent plate will now be explained by way of examples.

It is assumed that the objective lens 8 is designed for focusing through a substrate (refractive index = 1.5) of 1.2 mm thick and has a numerical aperture (N.A.) of 0.5 while the refractive index of each of the transparent plates 33 and 34 is 1.5.

The thickness of each data layer is determined so that the total thickness of the transparent plate, disk substrate, and transparent partition layer(s) is 1.2 mm between the objective lens and the target data layer. For example, the thickness of the data layer 28, 29, or 30 is less than 1 $\mu$m, compared with that of the other layers. If the thickness of each of the transparent partition layers 31 and 32 is 100 $\mu$m, the two transparent plates are 100 $\mu$m and 200 $\mu$m in thickness and the substrate of the optical disk has a thickness of 1 mm. Preferably, the disk substrate, transparent partition layers, transparent plates are the same in the refractive index so that the optimum convergence of light can be ensured. Also, the light absorption of each data layer is 20%.

The operation of focusing and reproducing data from a target data layer will be described. It is understood that any data layer located within a range of about 200 $\mu$m from the objective lens can be focused with a conventional servo system of the optical disk apparatus.

Figure 7A:
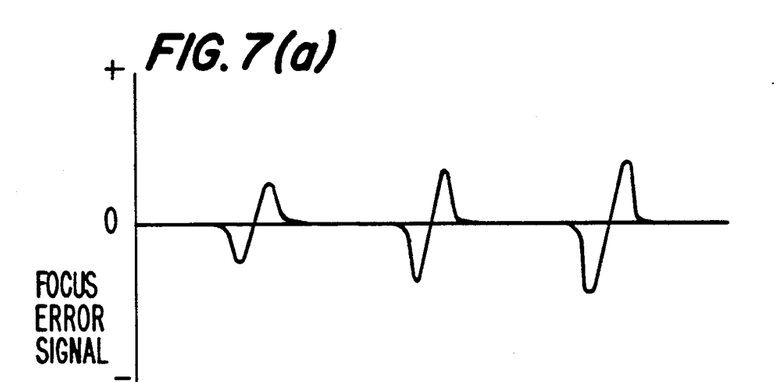
FIGS. 7(a)-7(b) are diagrams of characteristics showing a servo signal and the dependency of reproduced signal amplitude on distance according to the third embodiment.
Figure 7B:
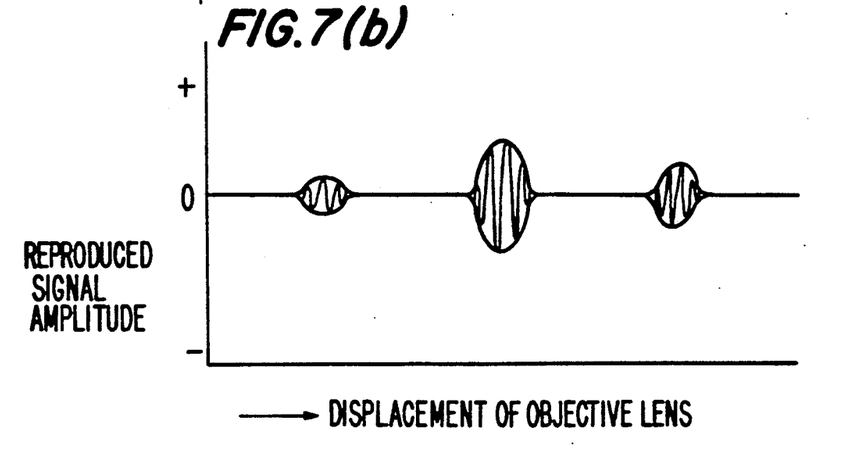

FIGS. 7(a) and 7(b) respectively illustrate a focus error signal and a reproduced signal amplitude varying as the objective lens is displaced towards and then away from the substrate of the optical disk. Three S-shaped error signs corresponding to their respective three data layers are shown in FIG. 7(a). Thus, corresponding amplitude faults to the S-shaped errors in the focus error signal appear in the reproduced signal as shown in FIG. 7(b).

The focus control will now be explained with reference to the second data layer as a target layer. The steps are:

1) inserting a transparent plate of 100 μm thick between the objective lens and the optical disk;

2) advancing the objective lens towards the optical disk;

3) then, displacing the objective lens away from the optical disk;

4) while monitoring the focus error signal, carrying out the focus control after the first S-shaped error is detected; and 5) upon detecting the second S-shaped error, establishing the focus on the target layer.

As the result, the focusing onto the second data layer will be accomplished. For having a focus onto the first layer, the focusing is carried out upon detecting the third S-shaped error with a 200 μm-thick transparent plate employed. For the first layer, the focusing is made upon detecting the first S-shaped error with no use of the transparent plate.

In the optical system associated with a plurality of data layers, there are interferences between the data layers and when the second or third data layer is a target, the incident light beam tends to be refracted due to the recording variations on the data layer(s) existing in the incident light side. However, when the data layers are fairly spaced from each other according to the embodiment, the portion of the light beam refracted at the first data layer is diffused before reaching the second data layer and after reflected, will be averaged until it affects on a detector for reproduction, increasing the noise in general term but not distorting the reproduced signal. Thus, the reproduction of data from the data layers can be made.

Although the above is explained referring to the three data layers, it will be possible to reproduce data from more than three data layers exhibiting lower refraction or absorption. The data layers may be provided in the form of pit arrangements, e.g. on a compact disc, perforated thin films, variations in the amorphous crystalline state, magneto-optical recording layers for reproduction of signals from a magnetic medium by means of magneto-optical effects, or a combination thereof. Particularly, if the combination of a magneto-optical recording layer as the first layer and other non-magneto-optical data layers is employed, the refraction of incident light beams can be disregarded because the first data layer causes the polarization of light to be slightly diverted. Hence, the interference to the signals on the second and following layers will be minimized. Accordingly, the reproduction of data from the multi-layer optical disk can be realized and the recording data capacity of each optical disk will thus be increased.

Although Embodiments 1, 2, and 3 are described with respect to reproducing signals, the present invention will afford equal success in recording, erasing, and over-writing signals.

What is claimed is:

1. An optical data recording/reproducing apparatus, in which recording and reproduction of data is carried out by directing a light beam onto an optical data recording medium having a data recording layer disposed on a transparent substrate thereof and detecting light which has been reflected from or transmitted through the recording medium, comprising:
   a light source for emitting a light beam;
   an objective lens for converging the light beam from the light source on the data recording layer and for establishing a focus on the data recording layer if the transparent substrate has an optical length which is equal to a predetermined optical length;
   an optical length correcting means provided between the objective lens and the optical data recording medium and having an optical length corresponding to a difference between the predetermined optical length and the optical length of the transparent substrate; and
   a photodetector for detecting light which has been transmitted through or reflected from the recording medium.

2. An apparatus according to claim 1, wherein the optical length of the optical length correcting means is variable corresponding to the thickness of the substrate of the optical data recording medium.

3. An apparatus according to claim 1, wherein the optical length correcting means is a transparent planer plate having a constant thickness.

4. An apparatus according to claim 1, wherein the optical length of the optical length correcting means is variable continuously or in steps.

5. An adapter for an optical data recording medium for use with a playback apparatus in which a light beam is directed onto a data recording layer of the recording medium and light which is reflected from or transmitted through the data recording layer is detected for reproduction of data, said adapter accommodating a smaller-sized data medium therein for loading into the playback apparatus; and
   said adapter carrying at a part thereof an optical length correcting means having a given optical length.

6. An adapter according to claim 5, further carrying at a part thereof a substrate thickness correcting plate having a thickness equal to that of the optical length correcting means and provided for movement in synchronism with the data recording medium.

7. An apparatus for recording and reproducing of data onto and from an optical data recording medium, in which recording and reproduction of data is carried out by directing a light beam onto the optical data recording medium having at least two data recording layers and detecting light which is reflected from or transmitted through the recording medium, comprising:
   a light source for emitting a light beam;
   an objective lens for converging the light beam from the light source on a data recording layer;
   an optical length correcting means provided between the objective lens and the optical data recording medium and having at least two different optical lengths;
   a means for selecting one of the different optical lengths of the optical length correcting means according to a position of a target data recording layer in the data recording medium; and
   a photodetector for detecting light which has been transmitted through or reflected from the recording medium.

8. An apparatus according to claim 7, wherein a difference between the different optical lengths of the optical length correcting means is equal to a distance between the data recording layers.

9. An apparatus according to claim 7, wherein the optical length correcting means is arranged movable corresponding to a target data recording layer.

10. An apparatus according to claim 7, wherein at least one of the data recording layers is arranged for record and reproduction by means of magneto-optical effect.

11. An optical data playback apparatus in which reproduction of data is carried out by directing a light beam onto an optical data recording medium having a data recording layer disposed on a transparent substrate thereof and detecting light which has been reflected from or transmitted through the recording medium, comprising;
   a light source for emitting a light beam;
   an objective lens for converging the light beam from the light source on the data recording layer and for establishing a focus on the data recording layer if the transparent substrate has an optical length equal to a predetermined optical length;
   an optical length correcting means provided between the objective lens and the optical data recording medium and having an optical length corresponding to a difference between the predetermined optical length and the optical length of the transparent substrate; and
   a photodetector for detecting light which has been transmitted through or reflected from the recording medium.

12. An apparatus according to claim 11, wherein the optical length of the optical length correcting means is variable corresponding to the thickness of the substrate of the optical data recording medium.

13. An apparatus according to claim 11, wherein the optical length correcting means is a transparent planer plate having a constant thickness.

14. An apparatus according to claim 11, wherein the optical length of the optical length correcting means is variable continuously or in steps.

15. A playback apparatus for an optical data recording medium, in which reproduction of data is carried out by directing a light beam onto the optical data recording medium having at least two data recording layers and detecting light which has been reflected from or transmitted through the recording medium, comprising:
   a light source for emitting a light beam;
   an objective lens for converging the light beam from the light source on a data recording layer;
   an optical length correcting means provided between the objective lens and the optical data recording medium and having at least two different optical lengths;
   a means for selecting one of the different optical lengths of the optical lengths correcting means according to a position of a target data recording layer in the data recording medium; and
   a photodetector for detecting light which has been transmitted through or reflected from the recording medium.

16. A playback apparatus according to claim 15, wherein a difference between the different optical lengths of the optical length correcting means is equal to a distance between the data recording layers.

17. A playback apparatus according to claim 15, wherein the optical length correcting means is arranged to be movable corresponding to a target data recording layer.

* * * * *